(12) United States Patent
Nagai (10) Patent No.: US 8,671,358 B2
(45) Date of Patent: Mar. 11, 2014

(54) INFORMATION-PROCESSING APPARATUS AND CONTROL METHOD THEREOF

(75) Inventor: Hiroyuki Nagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1212 days.

(21) Appl. No.: 12/187,079

(22) Filed: Aug. 6, 2008

(65) Prior Publication Data

US 2009/0064036 A1  Mar. 5, 2009

(30) Foreign Application Priority Data

Aug. 27, 2007 (JP) ................. 2007-220350

(51) Int. Cl.
*G06F 3/048* (2013.01)
*G06F 7/00* (2006.01)

(52) U.S. Cl.
USPC .......................... 715/781; 707/812

(58) Field of Classification Search
USPC .................. 715/781, 775, 854, 853
See application file for complete search history.

(56) References Cited

U.S. PATENT DOCUMENTS

| | | | | |
|---|---|---|---|---|
| 7,640,265 B2 * | 12/2009 | Shimizu et al. | ......... | 1/1 |
| 7,707,197 B2 * | 4/2010 | Kaasten et al. | ........ | 707/705 |
| 8,417,742 B2 * | 4/2013 | Itoh et al. | ........ | 707/812 |
| 2005/0050043 A1 * | 3/2005 | Pyhalammi et al. | ........ | 707/6 |
| 2006/0271588 A1 * | 11/2006 | Tanaka | ......... | 707/102 |
| 2007/0033191 A1 * | 2/2007 | Hornkvist et al. | ........ | 707/9 |

FOREIGN PATENT DOCUMENTS

| | | |
|---|---|---|
| EP | 0667585 A | 8/1995 |
| EP | 1513080 A | 3/2005 |
| JP | 2002-099554 | 4/2002 |
| JP | 2006-048521 | 2/2006 |

OTHER PUBLICATIONS

Semantic Analysis of Categorical Metadata to Search for Geographic Information. Riccardo Albertoni, Alessio Bertone, Monica De Martino. Istituto di Matematica Applicata e Tecnologie Informatiche Consiglio Nazionale delle Ricerche Genova, Italy (albertoni, bertone, demartino)@ge.imati.cnr.it.

All of the above references were cited in a Dec. 5, 2008 European Search Report of the counterpart European Patent Application No. 08163111.1. [Proceedings of the 16th International Workshop on Database and Expert Systems Applications (DEXA'05) 1529-4188/05 $20.00 © 2005 IEEE].

* cited by examiner

*Primary Examiner* — Rashawn Tillery
(74) *Attorney, Agent, or Firm* — Cowan, Liebowitz & Latman, P.C.

(57) ABSTRACT

An information-processing apparatus which can display search conditions of search folders in an easy-to-see state in a list display of files/folders is provided. The information-processing apparatus has a file system that searches a file/folder which matches a search condition, and can generate and manage a search folder used to store meta data of files/folders obtained by that search, and includes a function of displaying a list of meta data of files/folders. This information-processing apparatus checks if a folder to be displayed in the list is a search folder. As a result of checking, if the folder to be displayed in the list is a search folder, the apparatus displays search conditions in fields of meta data items for which the search conditions of the search folder are set, in place of, for example, meta data.

15 Claims, 12 Drawing Sheets

| | NAME | SIZE | DATE OF CREATION | TYPE |
|---|---|---|---|---|
| | ALL | | 2005/01/01 | FOLDER |
| | ATHLETIC FESTIVAL IN 2005 | | (2005/10/10) | (MOVING IMAGE) |
| | TRIP IN 2005 SUMMER (TRIP*) | | (2005/8/15~8/18) | |
| | PENDING.avi | 650MB | 2005/12/20 | MOVING IMAGE |
| | PENDING.jpg | 1.5MB | 2005/12/20 | STILL IMAGE |

102

FOLDER
PRIVATE CONTENTS
　ALL
　ATHLETIC FESTIVAL IN 2005
　TRIP IN 2005 SUMMER

INFORMATION-PROCESSING APPARATUS AND CONTROL METHOD THEREOF

BACKGROUND OF THE INVENTION

1. Field of the Invention

The present invention relates to a data display technique on a graphical user interface (to be abbreviated as "GUI" hereinafter) for file operations.

2. Description of the Related Art

Conventionally, a file system that manages files as digital data has a concept "folder" to manage files together. A GUI of the file system is provided in the form of presenting icons indicating a plurality of files and folders and their meta data.

Conventionally, the user manually stores files in a folder. However, as the number of files to be handled increases, an automated process is demanded. To meet this demand, a "search folder" is used. The search folder is a folder which automatically searches and collects files or folders that match specific search conditions. This search folder may be either a folder in which the entity of a searched file or folder is allocated, or a folder in which only information (meta data) of the searched file or folder is stored to show to the user as if it were storing the entity.

Upon presenting this search folder to the user, search conditions are important information. Hence, a method of presenting the search conditions as meta data, that is, the name of a folder has been proposed (see Japanese Patent Laid-Open Nos. 2006-048521 and 2002-099554).

However, when the search conditions are presented as the folder name of the search folder, the folder name tends to be long. If the search conditions are expressed in a character string format which is easy for the user to recognize, the character string becomes long. Also, when the search conditions are set for a plurality of meta data, and these meta data are to be enumerated, the folder name becomes long. In the format of presenting meta data of the search folder and other folders and files in a table form, if one folder name becomes long, the sizes of display areas of fields that display the folder names and file names are increased accordingly. This results in poor display efficiency.

SUMMARY OF THE INVENTION

It is an object of the present invention to provide a GUI which efficiently displays the search conditions of the search folder in a list display of files/folders.

The present invention in one aspect provides an information-processing apparatus for displaying a list of meta data of files and/or folders in a file system, searching for a file/folder that matches a search condition, and generating and managing a search folder used to store meta data of files/folders obtained by that search. The apparatus comprises determination means for determining if a folder to be displayed is a search folder, and display control means for, in a case that the folder to be displayed is a search folder, displaying search conditions in fields of meta data items for which the search conditions of the search folder are set.

The present invention in another aspect provides a method of controlling an information-processing apparatus, which displays a list of meta data of files and/or folders in a file system that searches a file/folder which matches a search condition, and can generate and manage a search folder used to store meta data of files/folders obtained by that search. The method comprises a determination step of determining if a folder to be displayed is a search folder, and a display control step of displaying, in a case that the folder to be displayed is a search folder, search conditions in fields of meta data items for which the search conditions of the search folder are set.

The present invention in still another aspect provides an information-processing apparatus for displaying a list of meta data of files and/or folders in a file system. The apparatus comprises determination means for determining if a folder to be displayed is a search folder, and display control means for, in a case that the folder to be displayed is a search folder, displaying search conditions in fields of meta data items for which the search conditions of the search folder are set.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

A file system to which the present invention is applied will be described.

Note that the file system depends on an OS (operating system), but the present invention is not limited to a specific OS as long as the file system has a hierarchical structure. In the broad sense, "folder" is also one type of file. However, in the following description, "folder" and "file" will be distinguished from each other since they are displayed on the GUI to have different forms, and "at least one of a file and folder" will be described as "file/folder".

Figure 1:
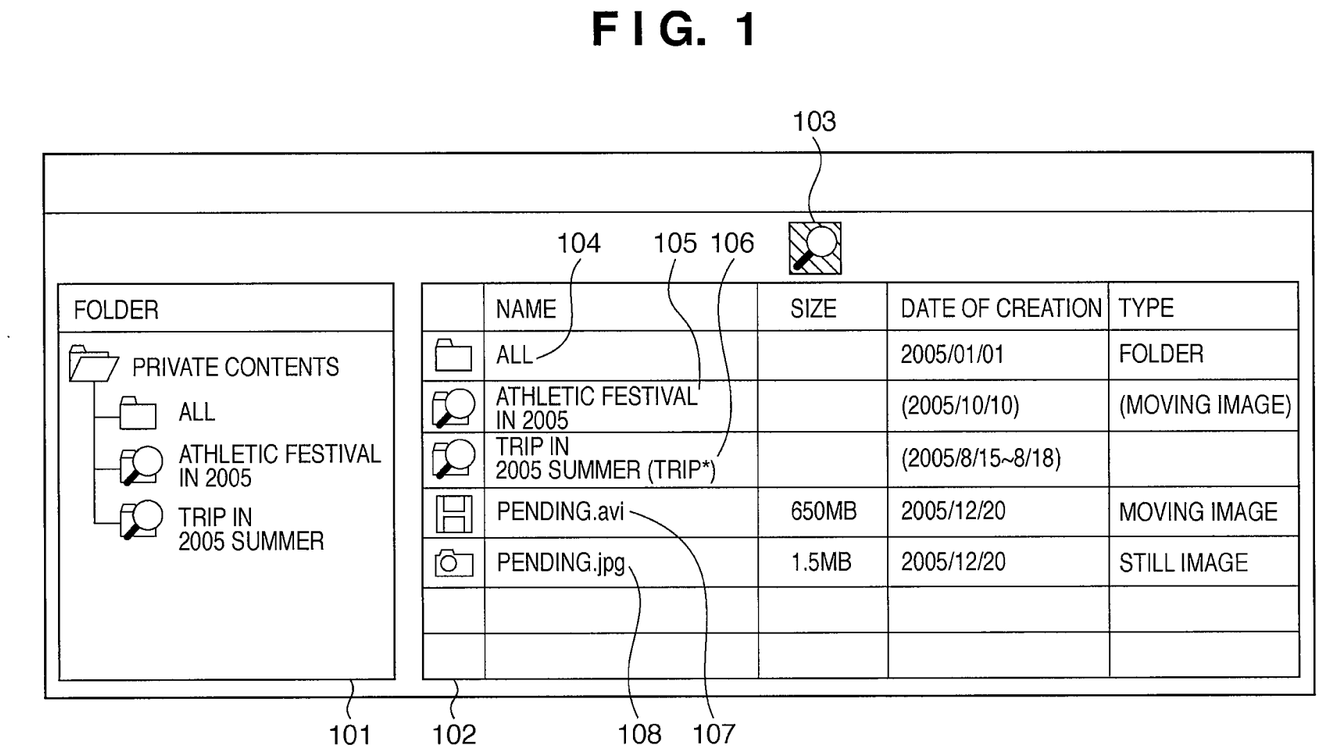
FIG. 1 is a view showing an example of a window (search condition display mode) of a GUI according to the first embodiment.

FIG. 1 shows an example of a window of a GUI of a file system which is presented to the user by this embodiment.

This GUI is roughly divided into two areas; the left area is a tree view 101 used to display the hierarchical structure of folders, and the right area is a list view 102 used to display a list of meta data of files/folders below a designated folder. The list includes icons and meta data. In case of FIG. 1, a "private contents" folder is selected on the tree view 101, and the list displayed on the list view 102 is that of files/folders in the selected "private contents" folder.

In FIG. 1, three folders and two files are displayed on the list view 102. The folders include search folders and a normal folder which is not a search folder. As described above, the search folder automatically searches files/folders that match specific search conditions, and stores information (meta data) of the searched files/folders. At this time, the search folder may store the entities of the searched files/folders together. The information-processing apparatus can display a list of meta data of folders and files as well as such search folders.

A normal folder 104 with a folder name "ALL" is displayed at the top of the list view 102 in FIG. 1. A search folder 105 with a folder name "athletic festival in 2005" is displayed below the normal folder 104. A search folder 106 with a folder name "trip in 2005 summer" is displayed below the search folder 105. A file 107 with a file name "pending.avi" is displayed below the search folder 106. A file 108 with a file name "pending.jpg" is displayed at the bottom of the list view 102. Meta data of the folder 104 and files 107 and 108 are displayed.

Reference numeral 103 denotes a search condition display mode switching button used to select whether to display search conditions or meta data in association with each search folder displayed on the list view 102. In FIG. 1, this search condition display mode switching button 103 is held down to set a state in which each search folder displays its search conditions. When this search condition display mode switching button 103 is OFF, that is, it is not held down, the search conditions of each search folder are not displayed, and meta data are displayed for that search folder as usual.

For the search folders 105 and 106, the search conditions set for these search folders are displayed. Each search condition is displayed in, for example, a parenthetic format, and can be distinguished from meta data. The search conditions set for the search folder 105 are that ["date of creation" is "2005/10/10" and "type" is "moving image"]. A field that displays meta data of "date of creation" displays "2005/10/10" as the search condition associated with "date of creation", and a field that displays meta data of "type" displays "moving image" as the search condition associated with "type". The search conditions set for the search folder 106 are that ["name" starts from "trip", and "date of creation" falls within a range from "2005/8/15 to 8/18"]. A field that displays meta data of "name" displays "trip in 2005 summer" as the name of the search folder 106 and "trip*" as the search condition associated with "name". The field that displays meta data of "date of creation" displays "2005/8/15 to 8/18" as the search condition associated with "date of creation". The field that displays meta data of "type" displays nothing.

Figure 2:
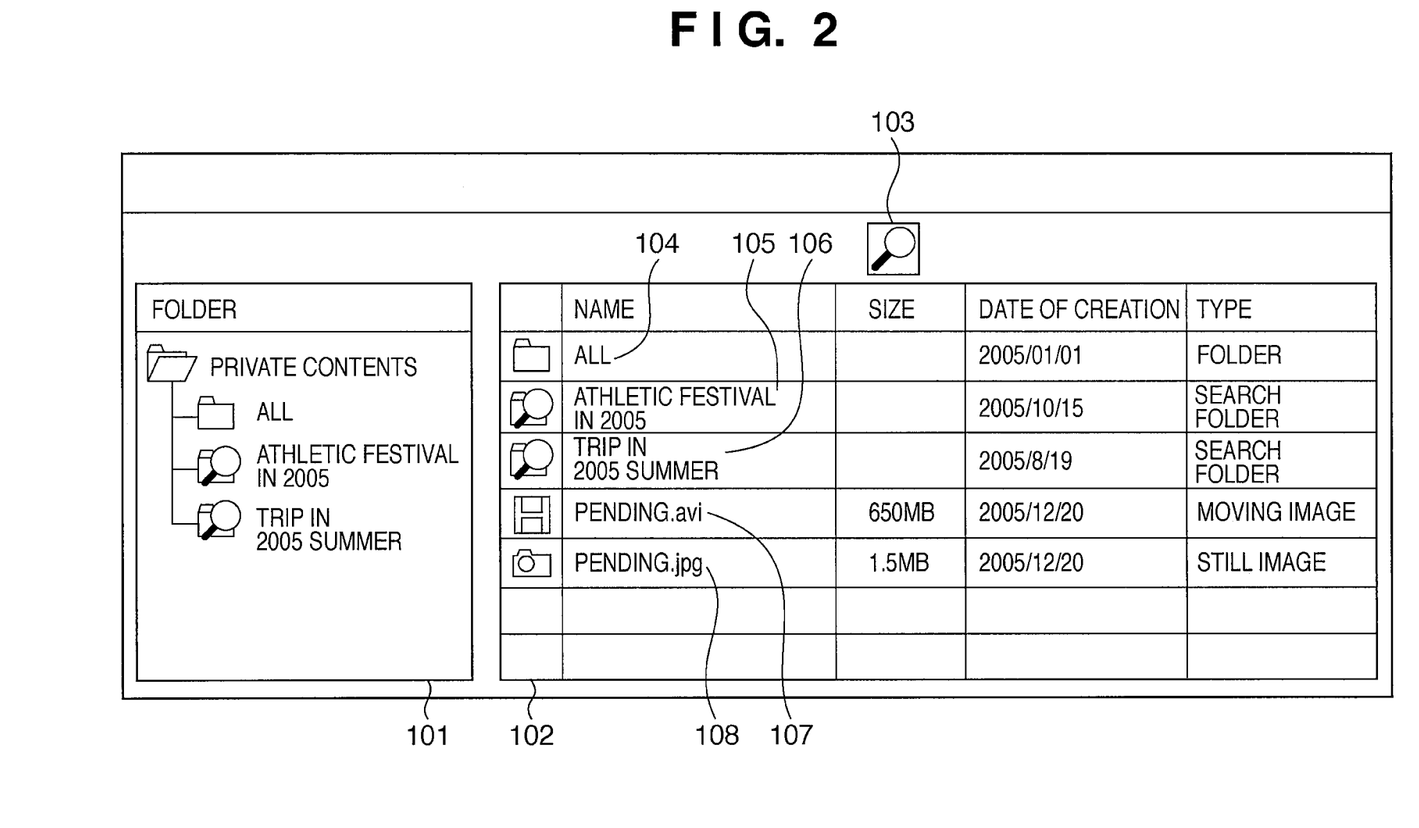
FIG. 2 is a view showing an example of a window (meta data display mode) of the GUI according to the first embodiment.

FIG. 2 shows an example of another state of the GUI of the file system which is presented to the user by this embodiment. FIG. 1 shows the window when the search condition display mode switching button 103 is held down, while FIG. 2 shows the window when the search condition display mode switching button 103 is not held down. The display contents of the search folders 105 and 106 on the list view 102 are changed, and meta data of these search folders are displayed in FIG. 2.

Figure 3:
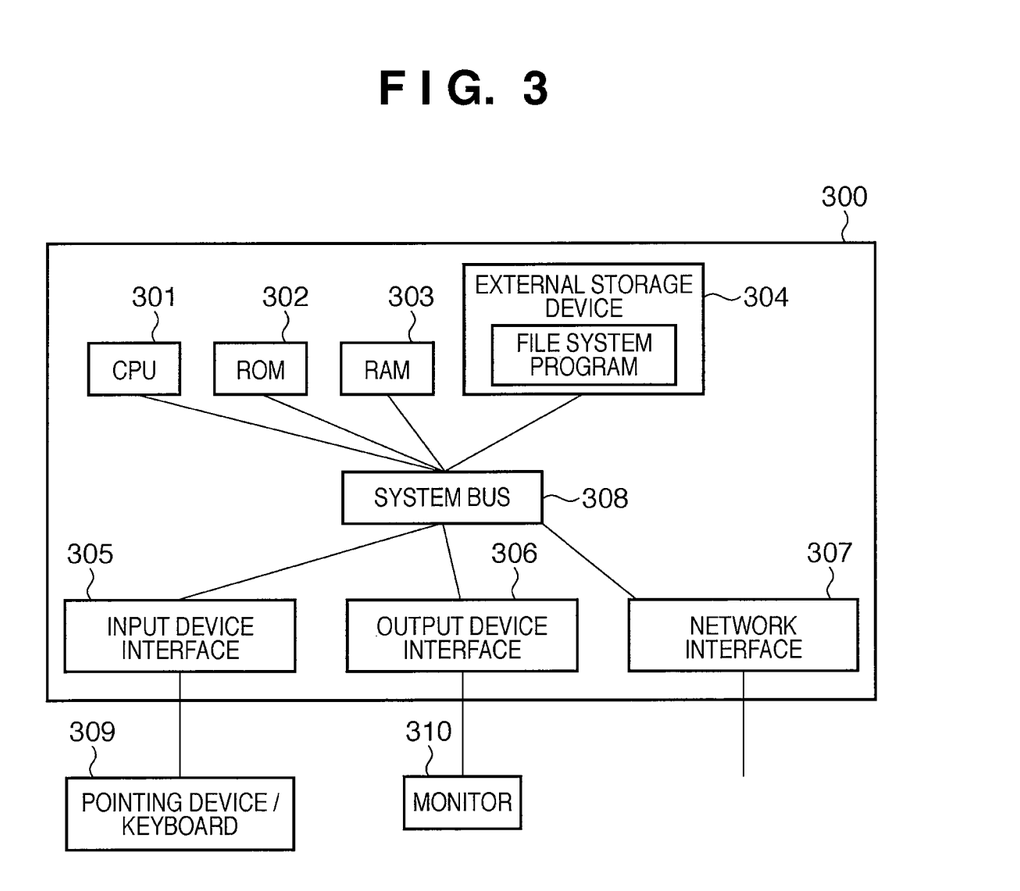
FIG. 3 is a block diagram showing the arrangement of a computer apparatus according to an embodiment.

FIG. 3 is a block diagram showing the arrangement of a computer apparatus (information-processing apparatus) which implements the aforementioned file system according to this embodiment. Reference numeral 301 denotes a Central Processing Unit (CPU) which controls a whole computer apparatus 300. Reference numeral 302 denotes a Read Only Memory (ROM) which stores programs and parameters which do not require any changes. Reference numeral 303 denotes a Random Access Memory (RAM) which temporarily stores programs and data supplied from an external storage device and the like. Reference numeral 304 denotes an external storage device such as a hard disk drive or the like. Reference numeral 305 denotes an interface with input devices such as a pointing device/keyboard 309, and the like, which are used to accept user's operations and to input data. Reference numeral 306 denotes an interface with a monitor 310, which is used to display data held by the computer apparatus 300 and supplied data. Reference numeral 307 denotes a network interface used to connect a network line such as the Internet and the like. Reference numeral 308 denotes a system bus which connects the respective units 301 to 307 to be able to communicate with each other.

In this embodiment, a file system program required to implement display control to which the present invention is applied is stored in the external storage device 304, and is executed by the CPU 301. The file system program may be included in an OS. For the user, the window shown in FIG. 1 or 2 is displayed via the monitor 310, and the user can make file operations using the pointing device/keyboard 309.

Figure 4:
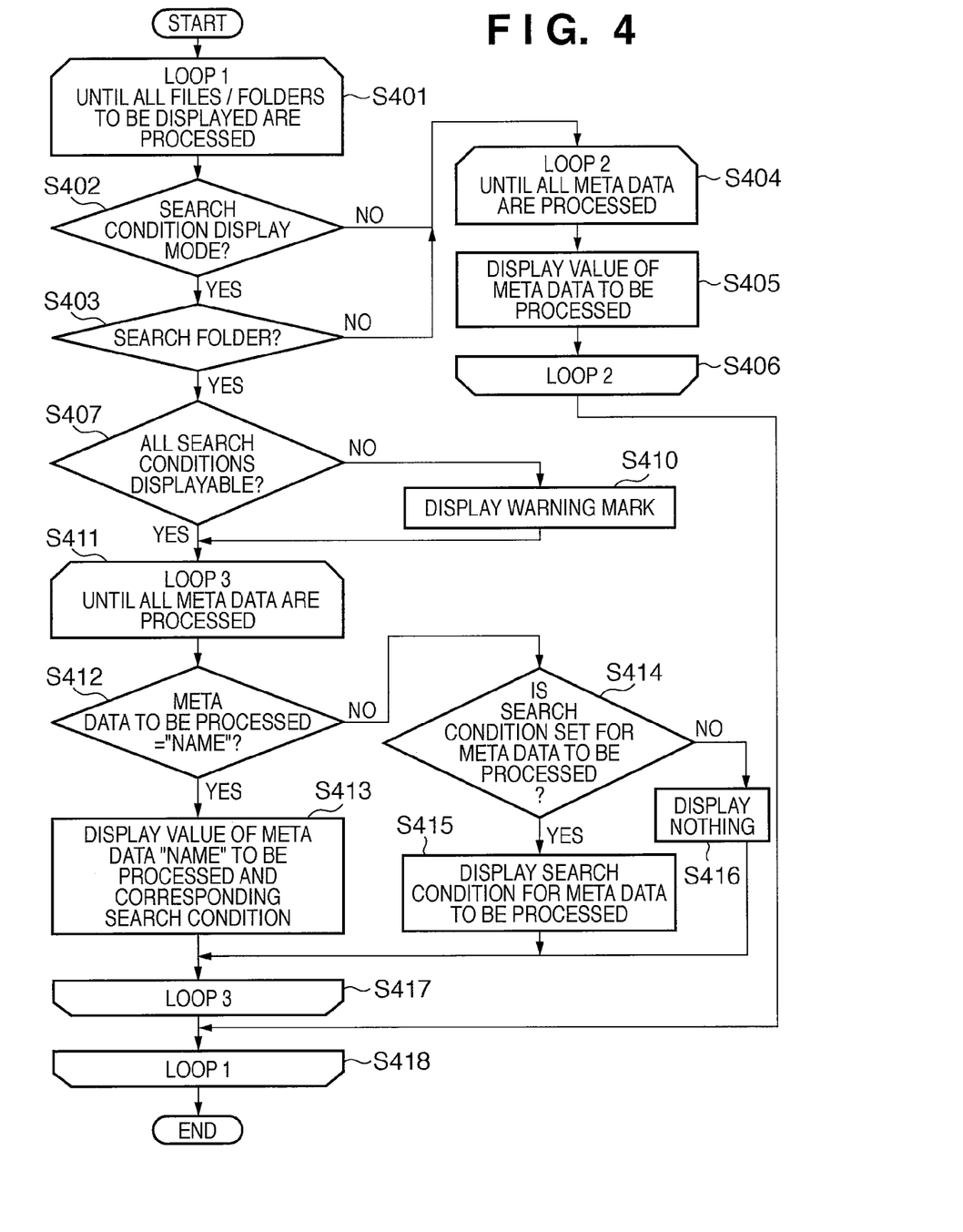
FIG. 4 is a flowchart of display processing according to the first embodiment.

FIG. 4 is a flowchart of display processing when the user wants to display a list of files/folders in an arbitrary folder. More specifically, this flowchart shows a method of determining the contents to be displayed on the list view 102 when the user selects a folder on the tree view 101.

The CPU 301 starts loop 1 which is repeated until all files/folders to be displayed are processed (step S401). For example, in FIGS. 1 and 2, folders and files in the "private contents" folder are those to be processed. This loop 1 is a loop that executes processing for each file/folder. In the loop, the CPU 301 checks first if the list display mode is a search condition display mode (step S402). This checking process is done based on the state of the search condition display mode switching button 103. More specifically, if the search condition display mode switching button 103 is ON (if it is held down), the CPU 301 determines that the search condition display mode is set.

If the list display mode is the search condition display mode, the CPU 301 checks if an object to be displayed is a search folder (step S403). If it is determined in step S402 that the list display mode is not the search condition display mode, or if it is determined in step S403 that the object to be displayed is not a search folder, the CPU 301 executes processing for displaying meta data. In this case, the CPU 301 starts loop 2 which is repeated until all meta data to be displayed are processed (step S404). This loop 2 is a loop that executes processing for each meta data. Next, the CPU 301 displays a value of meta data (step S405). All meta data of the normal folder 104 and files 107 and 108 in FIG. 1 and the folders and files in FIG. 2 are displayed by the processing of this step S405. Upon completion of the processing in step S405 for all the meta data, the CPU 301 exits loop 2 in step S404 (step S406).

If it is determined in step S403 that the object to be displayed is a search folder, the CPU 301 examines all search conditions of the search folder, and checks if the search conditions are displayable (step S407). Whether or not the search conditions can be displayable is determined by, for example, seeing if meta data items for which the search conditions are set include an item which is not displayed on the window, and if a combination of search conditions between those for respective meta data items includes that other than a logical AND. Assume that a basic display expresses a case in which a combination of search conditions between those for respective meta data items includes only a logical AND. If meta data items for which the search conditions are set include an item which is not displayed on the window, and if a combination of search conditions between those for respective meta data items includes that other than a logical AND, the CPU 301 determines that the search conditions are not displayable.

If it is determined in step S407 that the search conditions are not displayable, the CPU 301 displays a predetermined warning mark that advises accordingly (step S410). Referring to an example of FIG. 5, warning marks 503 are given to search folders 501 and 502 by the processing in step S410. Search conditions of the search folder 501 are that ["genre" is "jazz" or "artist" is "Beethoven"]. In this case, since a combination of the search conditions between meta data items "genre" and "artist" includes a logical OR, the warning mark 503 is displayed to inform the user that the search conditions cannot be normally displayed. A search condition of the search folder 502 is that ["playback time" is less than 1 minute]. In this case, since a meta data item "playback time" is not an item to be displayed, the warning mark 503 is also displayed. On the other hand, a search condition of a search folder 504 is ["artist" is "Mozart or Schubert"], and includes a logical OR. However, this logical OR is for one meta data. For this reason, the CPU 301 determines in step S407 that the search condition includes only a logical AND.

Figure 5:
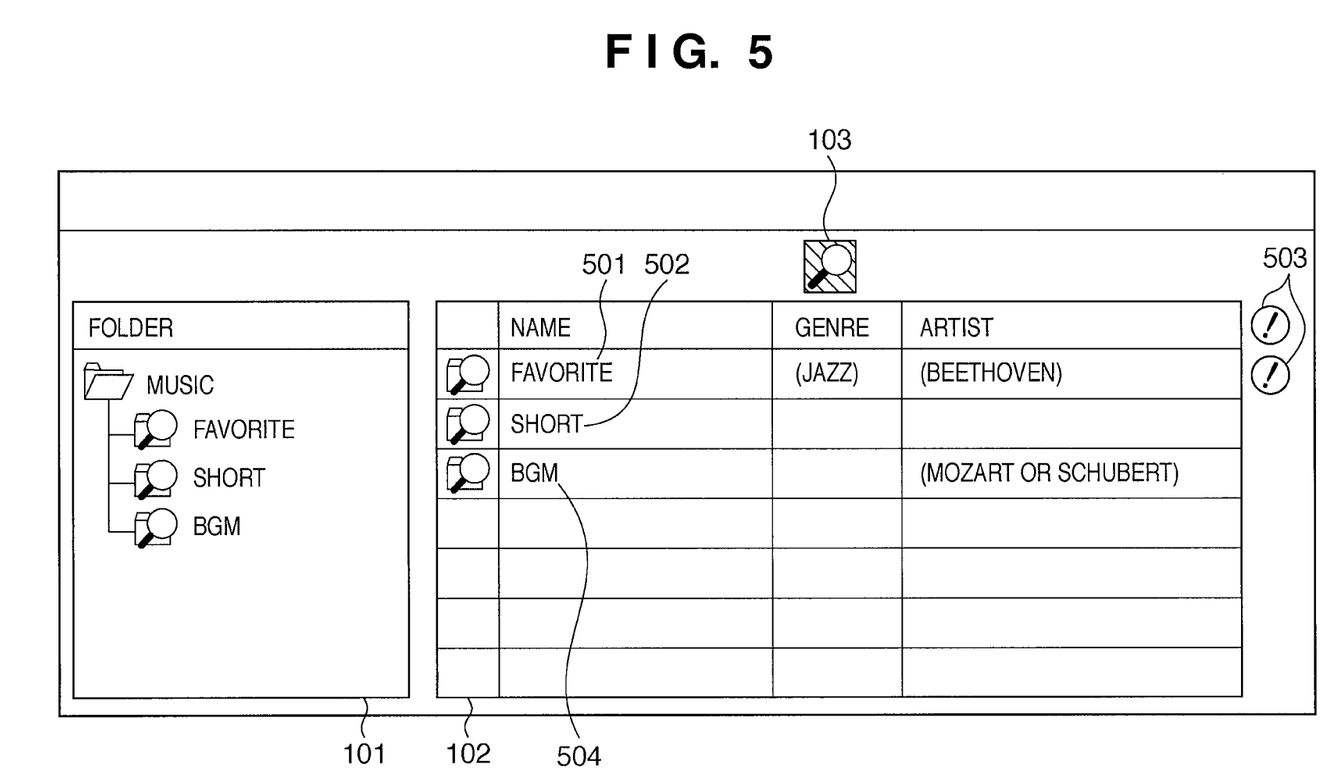
FIG. 5 is a view showing an example of a window (complicated search condition display mode) of the GUI according to the first embodiment.

The search conditions for one meta data are enumerated in the field of that meta data like the search folder 504. If it is determined in step S407 that the search conditions are displayable, or after step S410, the CPU 301 starts loop 3 which is repeated until all meta data of one file or folder are processed (step S411). This loop 3 is a loop that executes processing for each meta data.

In this loop 3, the CPU 301 checks if meta data to be processed is "name" (step S412). If it is determined in step S412 that the meta data to be processed is "name", the CPU 301 displays the value and search condition of that meta data (step S413). The CPU 301 displays the search condition in parentheses, as shown in FIG. 1. If it is determined in step S412 that the meta data to be processed is not "name", the CPU 301 checks if a search condition is set for the meta data to be processed (step S414). If the search condition is set for the meta data to be processed, the CPU 301 displays the search condition of that meta data to be processed (step S415). On the other hand, if no search condition is set for the meta data to be processed, the CPU 301 displays nothing (step S416). The reason why the "type" meta data field of the search folder 106 in FIG. 1 displays nothing is as a result of the processing of this step S416. Upon completion of the display processing in steps S413, S415, and S416, the CPU 301 exits loop 3 started in step S411 (step S417). After step S417 or step S406, the CPU 301 ends loop 1 started in step S401 (step S418).

The flowchart of the display processing has been described.

Second Embodiment

Figure 6:
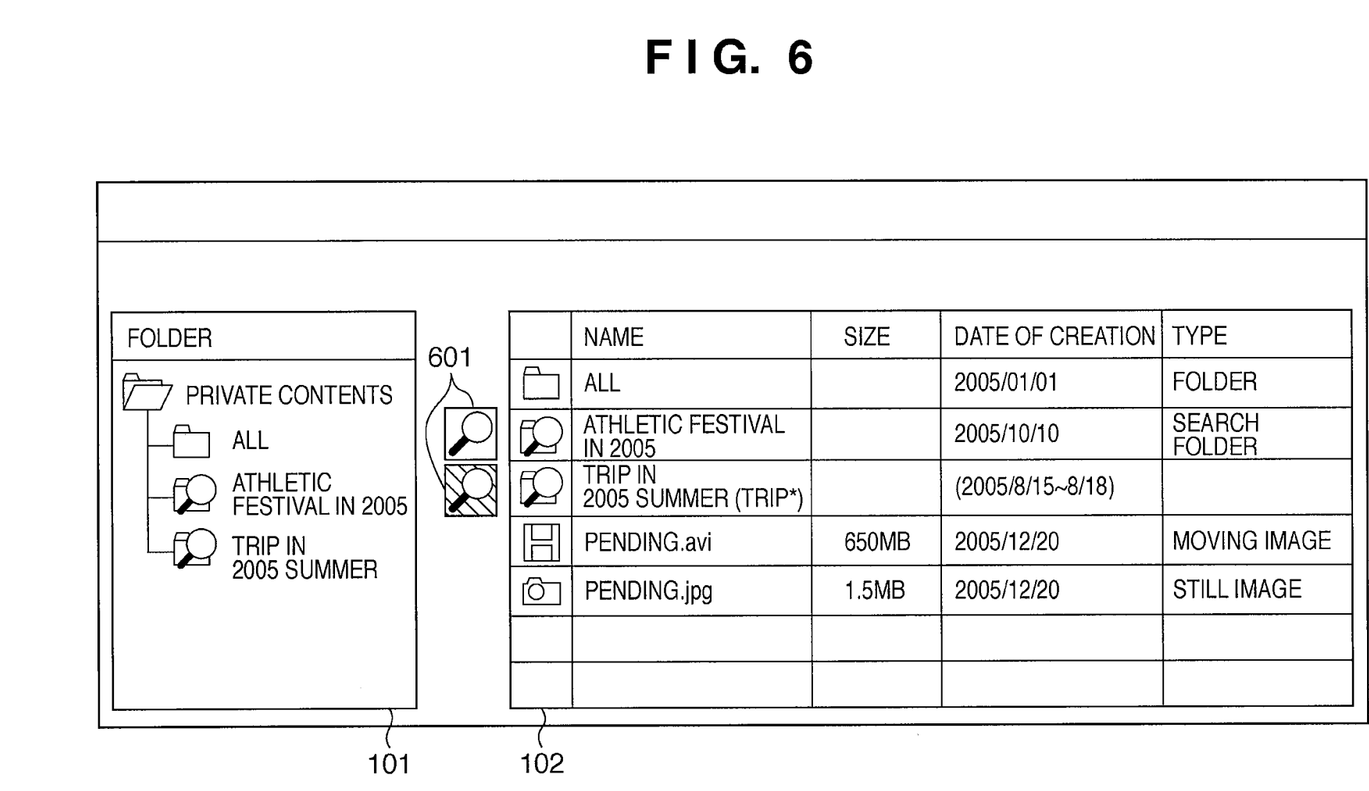
FIG. 6 is a view showing an example of a window of a GUI according to the second embodiment.

In the first embodiment, whether to display search conditions or meta data for all the meta data is determined in accordance with the state of the search condition display mode switching button 103. Instead, a search condition display mode switching button 601 may be provided to each search folder, as shown in FIG. 6, and whether to set or cancel the search condition display mode may be switched for each search folder.

In this case, the arrangement of a computer apparatus is expressed by FIG. 3 as in the first embodiment. Also, a flowchart executed when the user wants to display a list of files/folders in an arbitrary folder is expressed by FIG. 4 as in the first embodiment. However, unlike in the first embodiment, in step S402 of checking if the search condition display mode is set, the CPU 301 confirms the hold-down state of the search condition display mode switching button 601 for each search folder.

Third Embodiment

Figure 7:
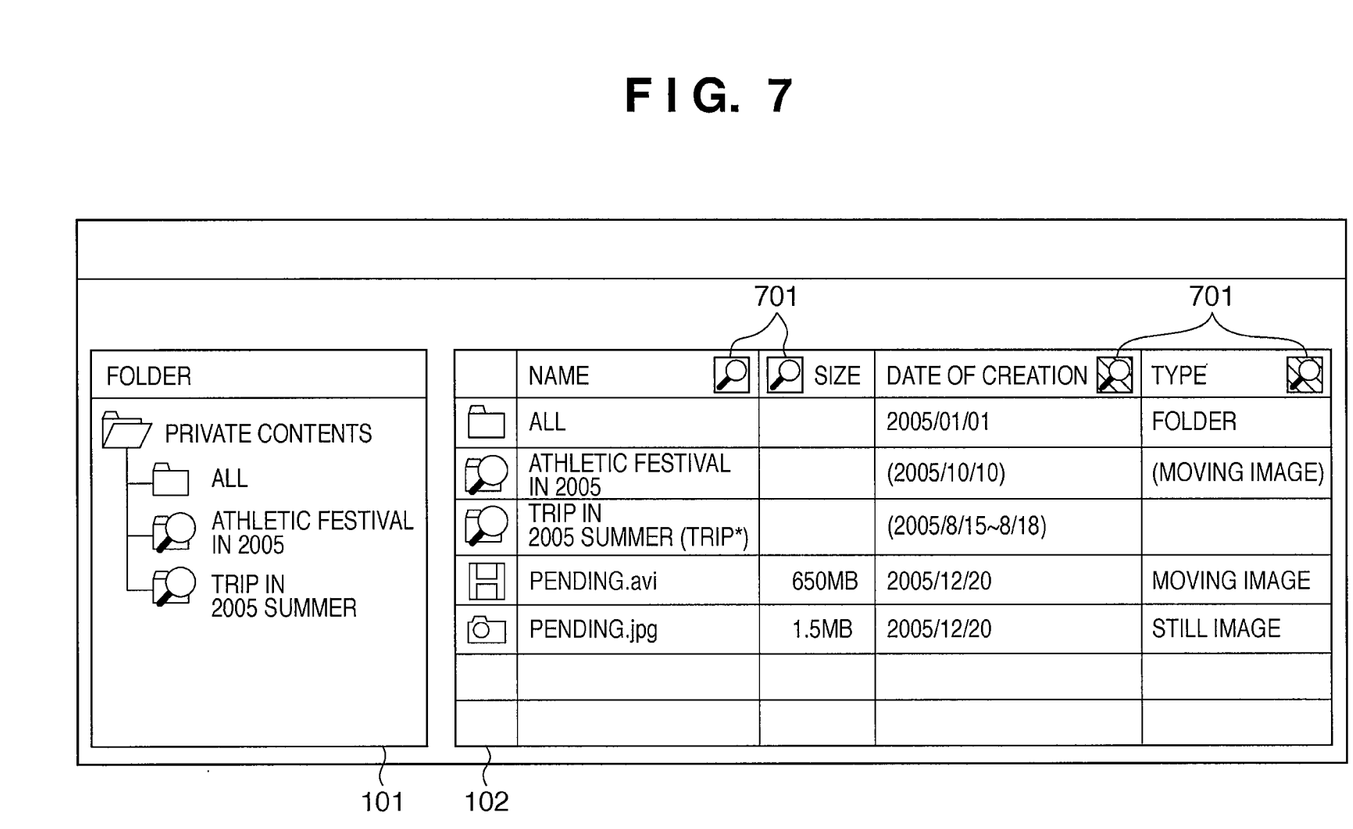
FIG. 7 is a view showing an example of a window of a GUI according to the third embodiment.

In the first embodiment, whether to display search conditions or meta data for all the meta data is determined in accordance with the state of the search condition display mode switching button 103. Instead, a search condition display mode switching button 701 may be provided to each meta data item, as shown in FIG. 7, and whether to set or cancel the search condition display mode may be switched for each meta data item.

Figure 8:
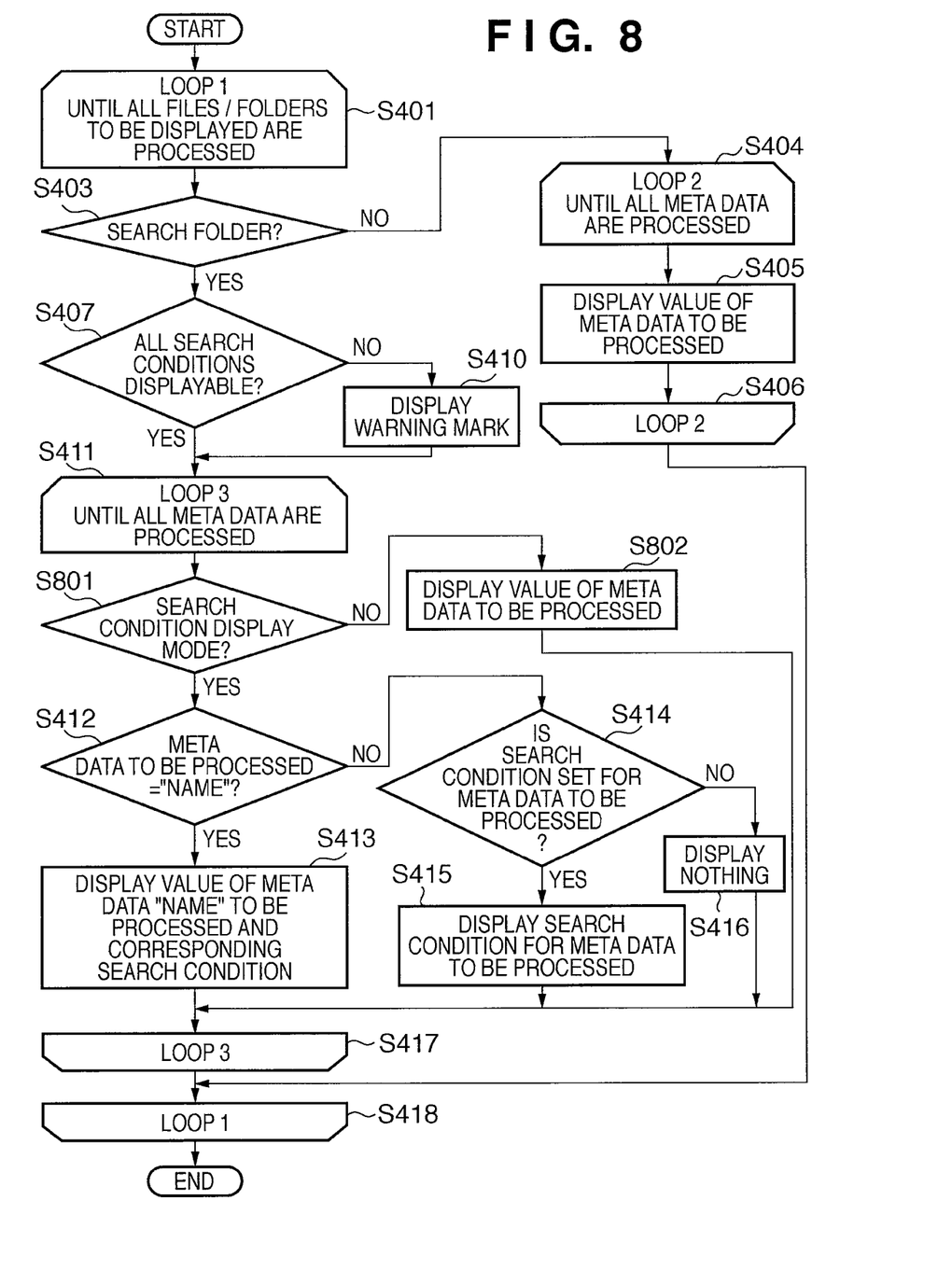
FIG. 8 is a flowchart of display processing according to the third embodiment.

In this case, the arrangement of a computer apparatus is expressed by FIG. 3 as in the first embodiment. A flowchart executed when the user wants to display a list of files/folders in an arbitrary folder is expressed by FIG. 8. The difference from the flowchart in FIG. 4 is that step S801 corresponding to step S402 of checking if the search condition display mode is set is executed in loop 3 started in step S411. If it is determined in step S801 that the search condition display mode is not set, the CPU 301 displays a value of meta data to be processed (step S802). Whether or not the search condition display mode is set is checked based on the state of the search condition display mode switching button 701 for each meta data item. More specifically, if the search condition display mode switching button 701 is ON (if it is held down), the CPU 301 determines for that meta data item that the search condition display mode is set.

Fourth Embodiment

Figure 9:
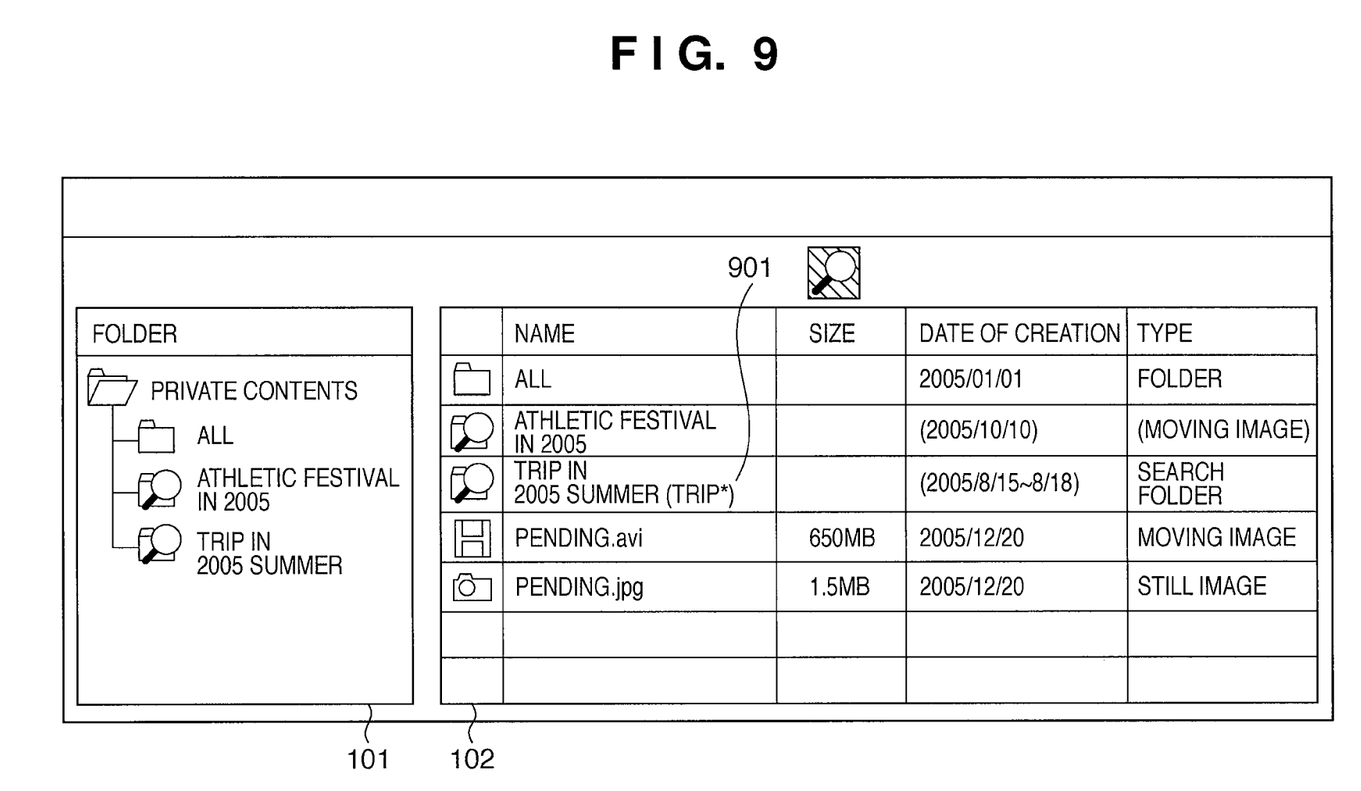
FIG. 9 is a view showing an example of a window of a GUI according to the fourth embodiment.

In the first embodiment, upon displaying search conditions, if no search condition is set for meta data to be processed, nothing is displayed. Instead, if there is no search condition to be displayed, meta data may be displayed, as shown in FIG. 9. The search condition display mode switching method may be the same as that in the first embodiment. In FIG. 9, since a search folder 901 has no search condition associated with meta data "type", meta data of the search folder itself is displayed in the "type" field.

Figure 10:
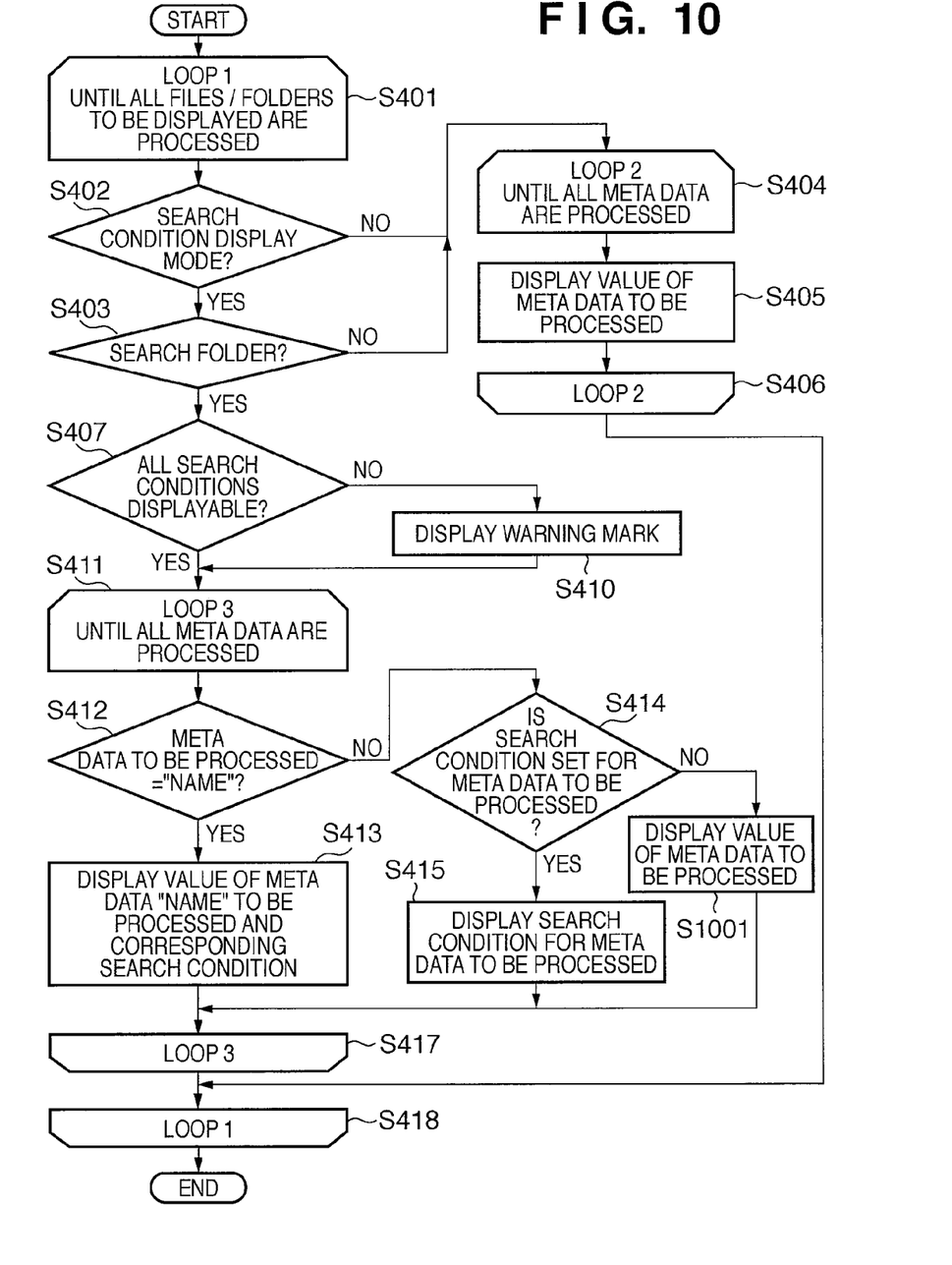
FIG. 10 is a flowchart of display processing according to the fourth embodiment.

In this case, the arrangement of a computer apparatus is expressed by FIG. 3 as in the first embodiment. A flowchart executed when the user wants to display a list of files/folders in an arbitrary folder is expressed by FIG. 10. The difference from FIG. 4 is that step S1001 of displaying a value of meta data to be processed is executed in place of step S416 of displaying nothing.

Fifth Embodiment

Figure 11:
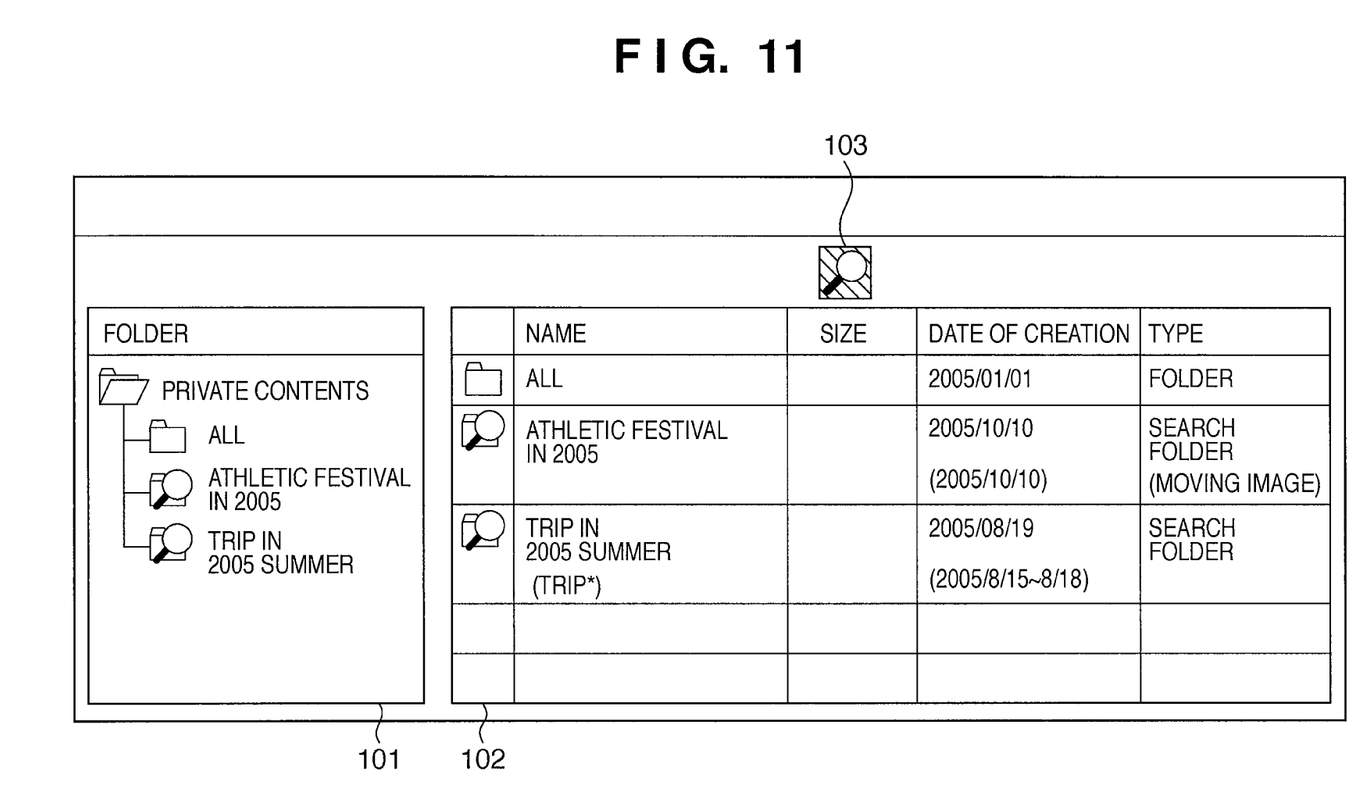
FIG. 11 is a view showing an example of a window of a GUI according to the fifth embodiment.

In the first embodiment, the search condition and meta data value are displayed together for only the meta data "name". However, as shown in FIG. 11, all meta data may be displayed together.

Figure 12:
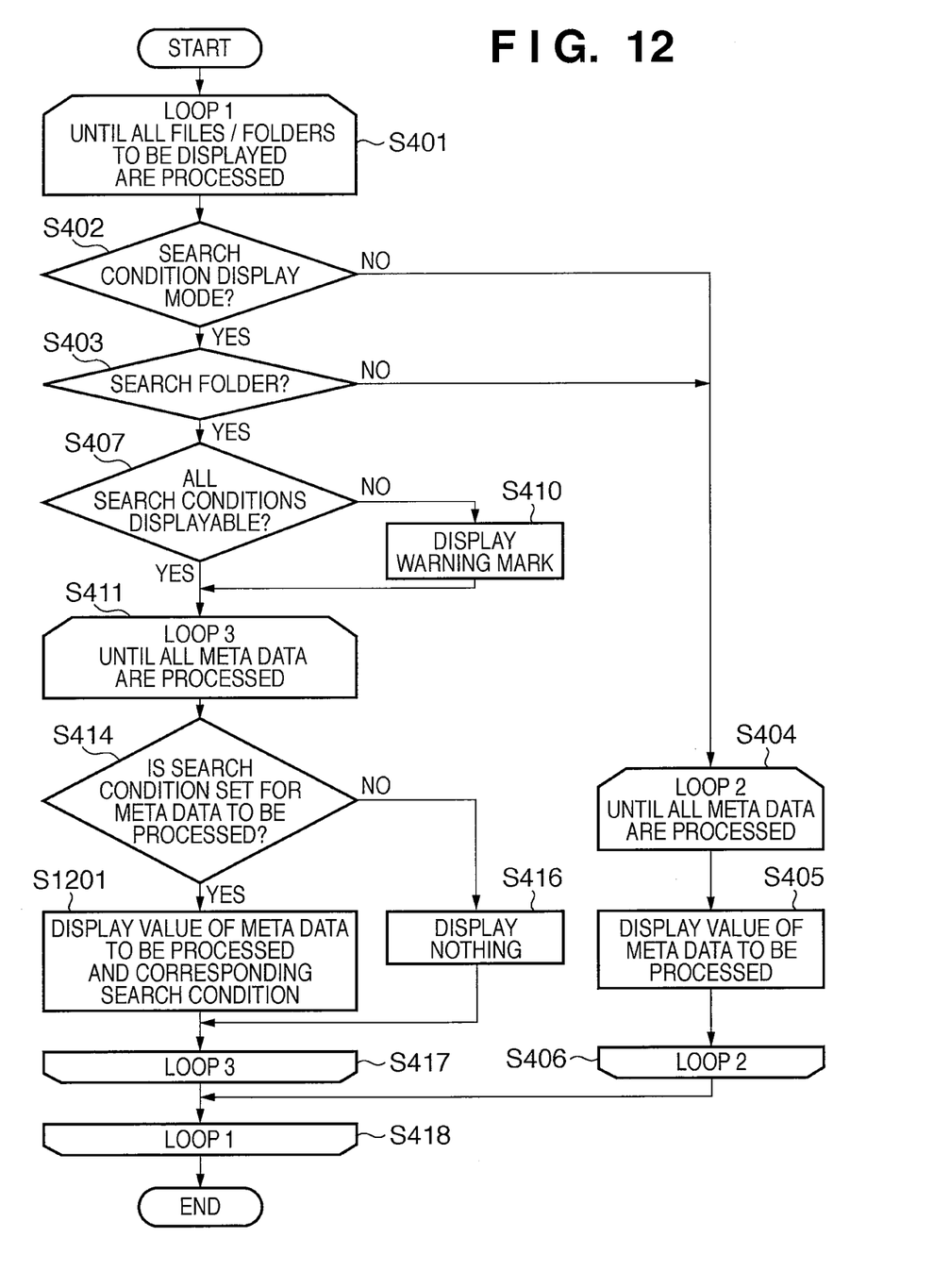
FIG. 12 is a flowchart of display processing according to the fifth embodiment.

In this case, the arrangement of a computer apparatus is expressed by FIG. 3 as in the first embodiment. A flowchart executed when the user wants to display a list of files/folders in an arbitrary folder is expressed by FIG. 12. The difference from FIG. 4 is as follows. Step S412 of checking if meta data to be processed is "name" and step S413 of displaying a value of the meta data "name" to be processed and the search condition for that meta data are omitted. If it is determined in step S414 that the search condition is set for the meta data to be processed, step S1201 of displaying a value of the meta data to be processed and a search condition for that meta data is executed in place of step S415.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-220350, filed Aug. 27, 2007, which is hereby incorporated by reference herein in its entirety.

What is claimed is:

1. An information-processing apparatus for searching for a file/folder in a file system that matches a search condition, generating and managing a search folder used to store data of files/folders obtained by that search, and displaying a list of files and/or folders, each of the files and/or folders in the list displayed in association with one or more respective fields of meta data, the apparatus having a processor and comprising:
    a determination unit configured to determine if a folder to be displayed in the list is a search folder, a folder that searches and collects files or folders that match search conditions associated with the search folder; and
    a display control unit configured to, in a case that the folder to be displayed in the list is a search folder, display search condition values, instead of meta data of the search folder, in fields of meta data items corresponding to the search conditions in the list, for which the search conditions of the search folder are set, wherein the search conditions of the search folder are different from the metadata of the search folder.

2. An apparatus according to claim 1, further comprising selection means for prompting a user to select whether or not to operate said display control means,
    wherein said display control means is configured to operate in a case that the user selects to operate said display control means via said selection means.

3. An apparatus according to claim 2, wherein said selection means is provided for each file/folder to be displayed.

4. An apparatus according to claim 2, wherein said selection means is provided for each meta data item to be displayed.

5. An apparatus according to claim 1, wherein said display control means is configured to display a notice in correspondence with the search folder in a case that the folder to be displayed is a search folder, and a meta data item for which the search condition of the search folder is set is an item not to be displayed or the search conditions of the search folder include a logical OR.

6. An apparatus according to claim 1, wherein said display control means is configured to display a search condition in a field of a meta data item for which the search condition is set, and to display meta data of the search folder in a field of a meta data item for which no search condition is set in a case that the folder to be displayed is a search folder.

7. An apparatus according to claim 1, wherein said display control means is configured to display a search condition together with meta data in a field of a meta data item for which the search condition is set in a case that the folder to be displayed is a search folder.

8. An apparatus according to claim 1, wherein said display control means is configured to display a search condition of the search folder together with a name of the search folder in a field of a meta data item indicating a name of a file/folder in a case that the folder to be displayed is a search folder.

9. An apparatus according to claim 1, wherein said display control means is configured to display a search condition in a format distinguishable from meta data upon displaying the search condition of the meta data in a field of a meta data item.

10. A method of controlling an information-processing apparatus, that searches a file/folder in a file system which matches a search condition, can generate and manage a search folder used to store data of files/folders obtained by that search, and can display a list of files and/or folders, each of the files and/or folders in the list displayed in association with one or more respective fields of meta data, the method comprising:
- a determination step of determining if a folder to be displayed in the list is a search folder, a folder that searches and collects files or folders that match search conditions associated with the search folder; and
- a display control step of displaying, in a case that the folder to be displayed in the list is a search folder, search condition values, instead of meta data of the search folder, in fields of meta data items corresponding to the search conditions in the list, for which the search conditions of the search folder are set, wherein the search conditions of the search folder are different from the metadata of the search folder.

11. A program that, when loaded into a computer or processor, causes the computer or processor to become the information-processing apparatus of claim 1.

12. A program stored on a non-transitory storage medium that, when executed on an information-processing apparatus, causes the information-processing apparatus to perform a method according to claim 10.

13. A storage medium storing a program according to claim 11.

14. An information-processing apparatus for displaying a list of files and/or folders in a file system, each of the files and/or folders in the list displayed in association with one or more respective fields of meta data, the apparatus having a processor and comprising:
- a determination unit configured to determine if a folder to be displayed in the list is a search folder, a folder that searches and collects files or folders that match search conditions associated with the search folder; and
- a display unit configured to, in a case that the folder to be displayed in the list is a search folder, display search condition values instead of meta data of the search folder, in fields of meta data items corresponding to the search conditions in the list, for which the search conditions of the search folder are set, wherein the search conditions of the search folder are different from the metadata of the search folder.

15. An apparatus according to claim 1, wherein the list includes entries of the search folder and a normal folder representing a designated folder that stores one or more files/folders.

* * * * *